United States Patent
Aoto et al.

(10) Patent No.: US 7,682,714 B2
(45) Date of Patent: Mar. 23, 2010

(54) CONNECTING STRUCTURE OF A CELL MONITOR CONNECTOR TO A FUEL CELL STACK

(75) Inventors: Akira Aoto, Okazaki (JP); Toru Bisaka, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1081 days.

(21) Appl. No.: 10/140,828

(22) Filed: May 9, 2002

(65) Prior Publication Data
US 2002/0177019 A1   Nov. 28, 2002

(30) Foreign Application Priority Data
May 25, 2001 (JP) ............................. 2001-156452
Jun. 5, 2001 (JP) ............................. 2001-169278

(51) Int. Cl.
*H01M 8/00* (2006.01)
*H01R 3/00* (2006.01)
*H01R 4/48* (2006.01)
*H01R 13/11* (2006.01)
*H01M 2/06* (2006.01)
*H01M 2/18* (2006.01)

(52) U.S. Cl. ......................... 429/12; 429/34; 439/761; 439/855; 439/500

(58) Field of Classification Search ................... 429/12, 429/34, 37, 146, 23; 439/500, 596, 660
See application file for complete search history.

(56) References Cited

U.S. PATENT DOCUMENTS

| | | | |
|---|---|---|---|
| 4,732,822 A * | 3/1988 | Wright et al. ................. | 429/34 |
| 5,769,657 A * | 6/1998 | Kondo et al. ................. | 439/500 |
| 6,176,740 B1 * | 1/2001 | Abe et al. .................... | 439/596 |
| 6,423,441 B1 * | 7/2002 | Ronning et al. ............... | 429/82 |
| 6,531,876 B1 | 3/2003 | Einhart et al. | |
| 6,730,423 B2 * | 5/2004 | Einhart et al. ................. | 429/12 |
| 2003/0091884 A1 * | 5/2003 | Scartozzi ..................... | 429/32 |

FOREIGN PATENT DOCUMENTS

| | | | |
|---|---|---|---|
| JP | 60200468 A | * | 10/1985 |
| JP | 09283166 A | * | 10/1997 |
| JP | H09-283166 | | 10/1997 |

OTHER PUBLICATIONS

English Translation of first Official Letter of Jun. 9, 2005 of corresponding German Patent Application No. 102 23 186.9-45; German Version of first Official Letter of Jun. 9, 2005 of corresponding German Patent Application No. 102 23 186.9-45.

* cited by examiner

*Primary Examiner*—Keith Walker
(74) *Attorney, Agent, or Firm*—Kenyon & Kenyon LLP

(57) ABSTRACT

Embodiments of the present invention relate to a cell monitor connector having a pair of terminals is connected to a fuel cell stack including a plurality of fuel cells each having two separators. One terminal of the pair of terminals is caused to contact a first fuel cell at one of the two separators of the first fuel cell, and the other terminal of the pair of terminals is caused to contact a second fuel cell located adjacent to the first fuel cell at one of the two separators of the second fuel cell having the same polarity as the one of the separators of the first fuel cell, whereby an interval of the pair of terminals can be widened.

5 Claims, 5 Drawing Sheets

US 7,682,714 B2

CONNECTING STRUCTURE OF A CELL MONITOR CONNECTOR TO A FUEL CELL STACK

BACKGROUND OF THE INVENTION

1. Field of the Invention

The present invention relates to a connecting structure of a cell monitor connector to a fuel cell stack.

2. Description of Related Art

A fuel cell (for example, a polymer electrolyte fuel cell) includes a membrane-electrode assembly (MEA), a diffusion layer, and a separator. The MEA includes an electrolyte membrane and a pair of electrodes disposed on opposite sides of the electrolyte membrane. The pair of electrodes include an anode provided on one side of the membrane and constructed of a first catalyst layer and a cathode provided on the other side of the membrane and constructed of a second catalyst layer. A first diffusion layer is provided between the first catalyst layer and the separator, and a second diffusion layer is provided between the second catalyst layer and the separator. The separator has a passage formed therein for supplying fuel gas (hydrogen) to the anode and a passage formed therein for supplying oxidant gas (oxygen, usually, air) to the cathode. A module is constructed of at least one layer of a fuel cell. A number of modules are layered, and electrical terminals, electrical insulators, and end plates are disposed at opposite ends of the pile of modules to construct a stack of fuel cells (a fuel cell stack). After tightening the stack of fuel cells between the opposite end plates in a fuel cell stacking direction, the end plates are coupled to a fastening member (for example, a tension plate) extending in the fuel cell stacking direction outside the pile of fuel cells by bolts.

In the fuel cells, at the anode, hydrogen is changed to positively charged hydrogen ions (i.e., protons) and electrons. The hydrogen ions move through the electrolyte membrane to the cathode where the hydrogen ions react with supplied oxygen and electrons (which are generated at an anode of the adjacent MEA and move to the cathode of the instant MEA through a separator, or which are generated at an anode of the MEA located at one end of the pile of fuel cells and move to the cathode of the MEA located at the other end of the pile of the fuel cells through an outer electrical circuit) to form water as follows:

At the anode: 

At the cathode: 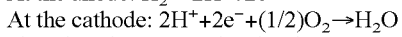

Since heat is generated at the above water product reaction and Joulean heat, a coolant passage (usually, a water passage) is formed in the separator to cool every fuel cell or every plural fuel cells.

To confirm that power is normally generated at the fuel cells, to control the flow of the reactant gas based on the cell voltage, and to protect a motor from an abnormal voltage, a cell voltage is monitored every fuel cell or every plural fuel cells.

Japanese Patent Publication No. HEI 9-283166 discloses a connecting structure of a cell monitor connector to a fuel cell stack where two circular holes are formed in the separators of every fuel cell, and more particularly, one hole is formed in a cathode side separator of the fuel cell and the other hole is formed in an anode side separator of the same fuel cell, and a pin terminal of the cell monitor connector is inserted into the one hole and another pin terminal of the cell monitor connector is inserted into the other hole.

However, with the conventional connecting structure of a cell monitor connector (a connector of a cell monitor) to a fuel cell stack, there is a problem that since each fuel cell is very thin, the terminal contacting the cathode side separator of a fuel cell and the terminal contacting the anode side separator of the same fuel cell interfere with each other and cannot be arranged.

Further, when a plurality of fuel cell stacks are provided, since numerous cell monitor connectors contact a fuel cell stack, the connecting structure of a cell monitor including the cell monitor connectors is complex and occupies a relatively large space.

SUMMARY OF THE INVENTION

An object of the present invention is to provide a connecting structure of a cell monitor connector (a connector of a cell monitor) to a fuel cell stack where a space between a pair of terminals of the cell monitor connector is widened compared with that of the conventional cell monitor connector while a thickness of the fuel cell is the same as that of the conventional fuel cell.

Another object of the present invention is to provide a connecting structure of a cell monitor including numerous cell monitor connectors to a fuel cell stack which is more compact and simple than that of the conventional connecting structure.

BRIEF DESCRIPTION OF THE DRAWINGS

The above and other objects, features, and advantages of the present invention will become apparent and will be more readily appreciated from the following detailed description of the preferred embodiments of the present invention in conjunction with the accompanying drawings.

DETAILED DESCRIPTION OF THE PREFERRED EMBODIMENTS

A connecting structure of a cell monitor connector (a connector of a cell monitor) to a fuel cell stack according to the present invention will be explained with reference to FIGS. 1-6 and 7, and a connecting structure of a cell monitor including a number of cell monitor connectors according to the present invention will be explained with reference to FIGS. 7-9.

A fuel cell to which the cell monitor connector is connected is a polymer electrolyte fuel cell 10. The fuel cell 10 may be mounted to, for example, a vehicle. However, the fuel cell 10 may be used for other purposes than for a vehicle.

Figure 1:
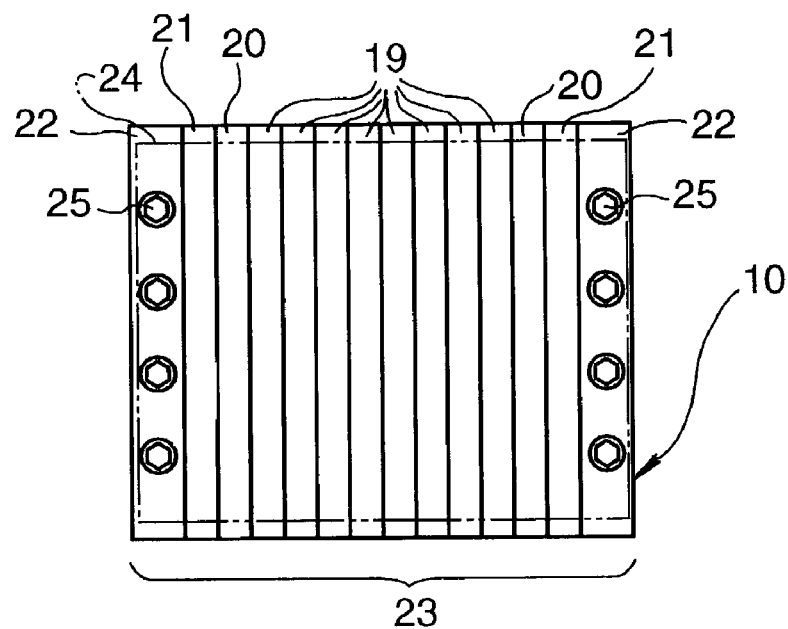
FIG. 1 is a front elevational view of a fuel cell stack to which a cell monitor connector is connected according to the present invention.
Figure 2:
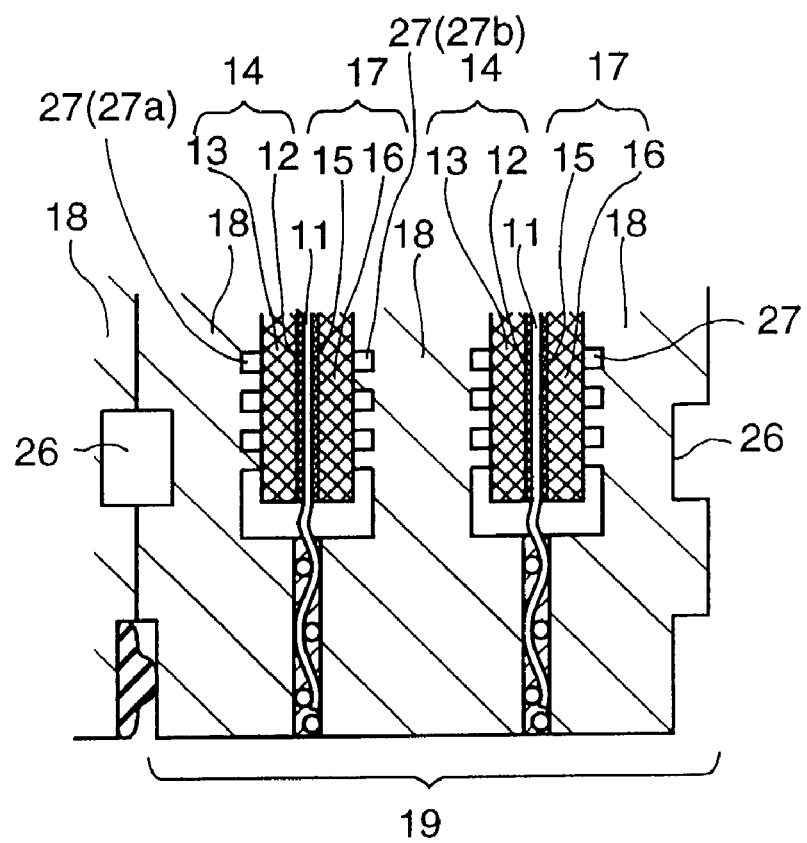
FIG. 2 is an enlarged cross-sectional view of a portion of a module of the fuel cell of FIG. 1.

As illustrated in FIGS. 1 and 2, the polymer electrolyte fuel cell 10 includes a membrane-electrode assembly (MEA), a diffusion layer 13, 16, and a separator 18. The MEA includes an electrolyte membrane 11 and a pair of electrodes 14, 17 disposed on opposite sides of the electrolyte membrane 11. The pair of electrodes 14, 17 include an anode 14 provided on one side of the membrane 11 and constructed of a first catalyst layer 12 and a cathode 17 provided on the other side of the membrane 11 and constructed of a second catalyst layer 15. A first diffusion layer 13 is provided between the first catalyst layer 12 and the separator 18, and a second diffusion layer 16 is provided between the second catalyst layer 15 and the separator 18. The separator 18 has a passage 27 (27a) formed therein for supplying fuel gas (hydrogen) to the anode 14 and a passage 27 (27b) formed therein for supplying oxidant gas (oxygen, usually, air) to the cathode 17. A module 19 is constructed of at least one layer of a fuel cell. A number of modules 19 are layered, and electrical terminals 20, electrical insulators 21, and end plates 22 are disposed at opposite ends of the pile of modules to construct a stack of fuel cells (a fuel cell stack 23). After tightening the stack of fuel cells between the opposite end plates 22 in a fuel cell stacking direction, the end plates 22 are coupled to a fastening member 24 (for example, a tension plate) extending in the fuel cell stacking direction outside the pile of fuel cells by bolts 25. A coolant passage 26 is provided every fuel cell or every plural fuel cells, for example, every two fuel cells.

The separator 18 separates fuel gas and oxidant gas from each other, fuel gas and cooling water from each other, or oxidant gas and cooling water from each other. The separator 18 is a conductive member and operates as an electric passage from an anode of one fuel cell to a cathode of an adjacent fuel cell. Among the two separators on opposite sides of the membrane of one fuel cell, the separator on the side of the cathode is a separator having a positive polarity (+) and the separator on the side of the anode is a separator having a negative polarity (−). Between the separator of a positive polarity and the separator of a negative polarity of one fuel cell, a cell electrical voltage (about 1 volt) is generated.

The separator 18 has a structure of any one of
(1) a plate made from carbon and having a coolant passage 26 and/or a reactant gas passage 27 formed therein,
(2) a conductive plate made from synthetic resin mixed with conductive particles or fibers and having a coolant passage 26 and/or a reactant gas passage 27 formed therein, and
(3) a combination of a plurality of metal plates having convex or concave portions for forming a coolant passage 26 and/or a reactant gas passage 27.

The separator 18 of FIG. 2 illustrates the carbon separator.

As illustrated in FIGS. 3-6, in order to monitor a cell voltage of a fuel cell 10 of the fuel cell stack 23, a cell monitor connector 30 is connected to the fuel cell stack 23 every fuel cell and/or every plural fuel cells (for example, every two fuel cells).

The cell monitor connector 30 includes a housing 32 and at least one terminal (for example, a pair of terminals) 31 held by the housing 32.

The terminal 31 is detachably connected to the fuel cell to hold the separator 18 of the fuel cell. The terminal 31 directly contacts the separator 18. The terminal 31 is made from conductive metal material, for example, metal-plated copper. Each terminal 31 is connected to a corresponding wire harness 33.

Figure 5:
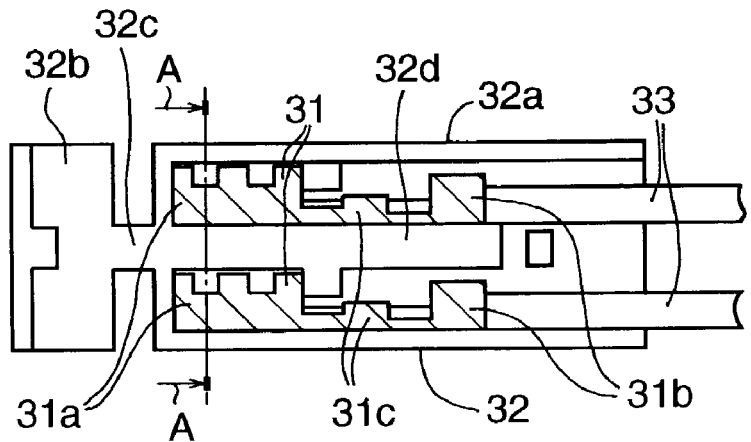
FIG. 5 is a plan view of the connecting structure of FIG. 3 when a cover of the cell monitor connector is open.
Figure 6:
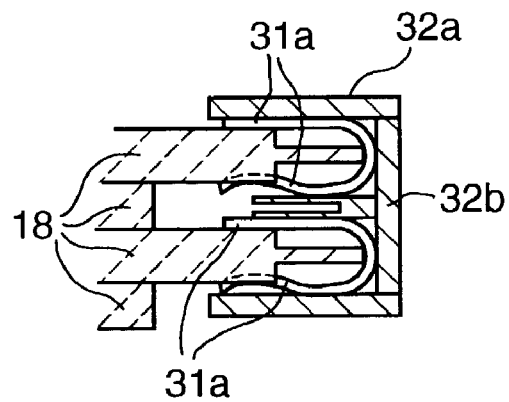
FIG. 6 is a cross-sectional view of the connecting structure along line A-A of FIGS. 4 and 5.

The housing 32 is made from non-conductive material, for example, synthetic resin. The housing 32 includes a case 32a for housing the terminals 31 and having upper and lower openings, a cover 32b rotatably coupled to the case 32a at a hinge 32c so as to be able to open and close the upper opening of the case 32a, and a partition 32d for partitioning an interior of the case 32a into two portions. As illustrated in FIG. 5 where the cover 32b is open, each of the pair of terminals 31 is disposed in a respective portion of the two portions inside the case 32a. When the cover 32b is closed, the terminals 31 are secured within the case 32a.

The terminal 31 includes a U-letter portion 31a having two legs for holding the separator 18 therebetween and for contacting the separator 18, a wire-harness-coupling portion 31b where a wire harness is connected to the terminal 31, and a connecting portion 31c connecting the U-letter portion 31a and the wire-harness-coupling portion 31b. The two legs of the U-letter portion 31a extend downward through the lower opening of the case 32a toward the separator 18 and squeeze a peripheral portion of the separator therebetween to contact the separator 18.

When the cell monitor connector 30 is connected to a fuel cell stack 23 including the plurality of fuel cells each having two separators 18, one terminal of the pair of terminals 31 of the cell monitor 30 is caused to contact a first fuel cell of the stack 23 at one of the two separators 18 of the first fuel cell, and the other terminal of the pair of terminals 31 of the same cell monitor 30 is caused to contact a second fuel cell located adjacent to the first fuel cell at one of two separators 18 of the second fuel cell having the same polarity as the one of the separators 18 of the first fuel cell.

Figure 3:
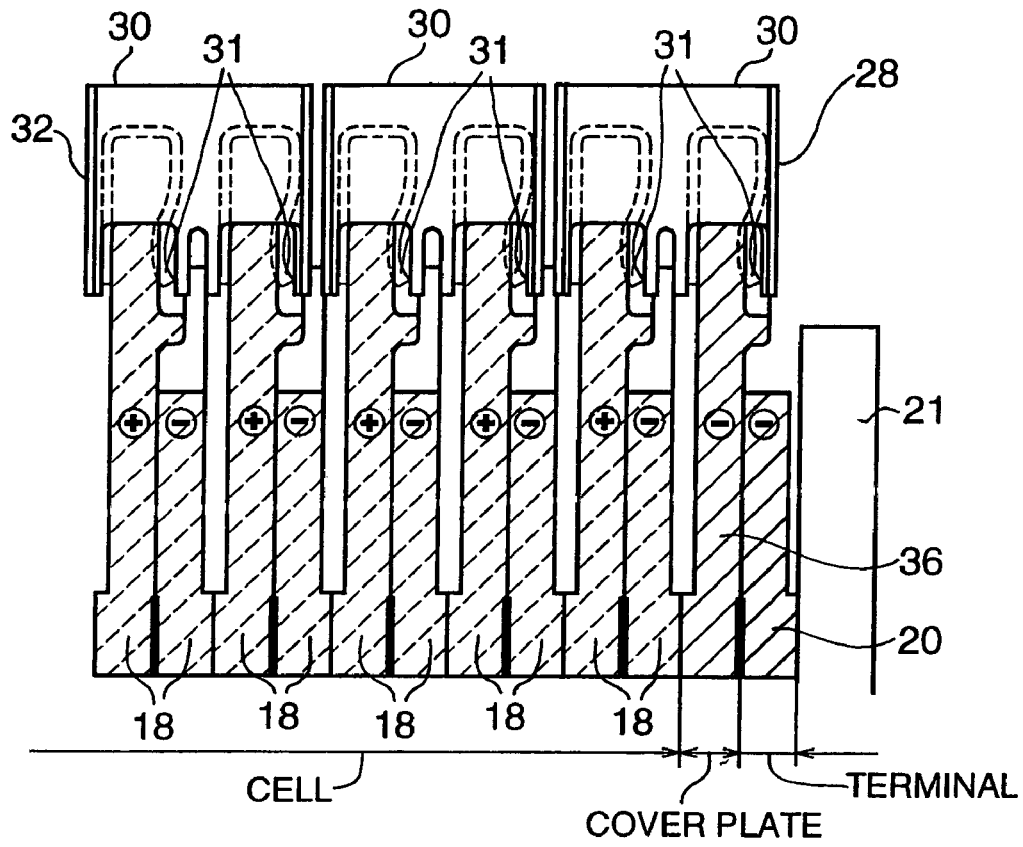
FIG. 3 is a front elevational view of a connecting structure of a cell monitor connector to a fuel cell stack according to one embodiment of the present invention.

The polarity of the separator 18 of the first fuel cell and the separator 18 of the second fuel cell which the pair of terminals of the cell monitor connector 30 are caused to contact may be positive or negative. FIG. 3 shows the embodiment where that polarity is positive. The interval of the pair of terminals 31 held by one housing 32 of the cell monitor connector 30 is equal to an interval of the separators having the same polarity of the adjacent two fuel cells of the fuel cell stack 23, i.e., 1.5 times the thickness of one fuel cell.

In the embodiment of FIG. 3, one of the two terminals 31 held by the housing 32 of one cell monitor connector 30 holds and contacts the separator 18 having a positive polarity of one fuel cell, and the other of the two terminals 31 held by the housing 32 of the same cell monitor connector 30 holds and contacts the separator 18 having a positive polarity of a fuel cell located adjacent to the one fuel cell.

Figure 4:
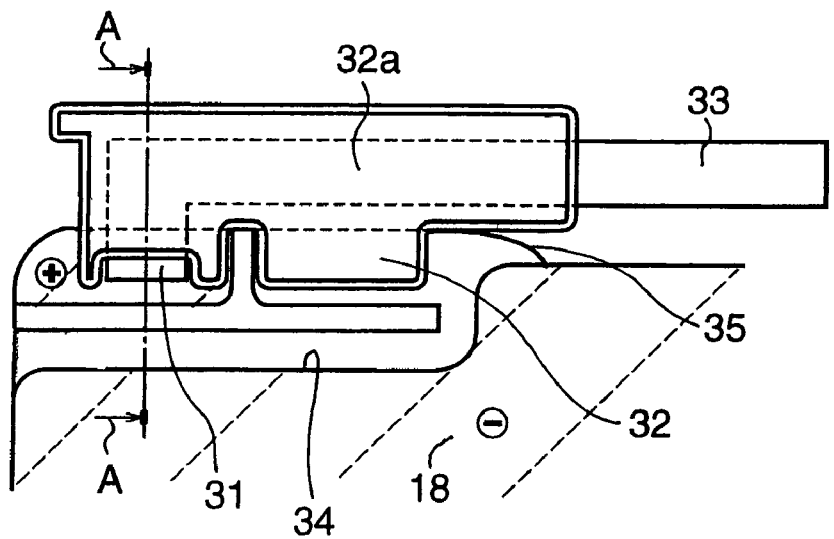
FIG. 4 is a side elevational view of the connecting structure of FIG. 3.

In order that when connected to a first separator having a first polarity of the fuel cell, the terminals 31 of the cell monitor connector 30 do not interfere with a second separator of the same fuel cell having a second, reverse polarity, any one of the following (a), (b) and (c) structures can be adopted:

(a) A recess 34 is formed in the second separator 18 at a portion of the second separator corresponding to a portion of the first separator where the terminal contacts the first separator.
(b) A protrusion 35 protruding in a direction away from the second separator is formed in the first separator 18.
(c) The recess 34 is formed in the second separator 18 as well as the protrusion 35 is formed in the first separator 18. FIG. 4 illustrates this structure.

In the connecting structure of the cell monitor connector 30 to the fuel cell stack 23 according to the present invention, since one cell monitor connector 30 is connected to two adjacent fuel cells, the fuel cell located at the end of the fuel cell stack 23 (hereinafter, an end fuel cell) cannot be monitored because the end fuel cell does not have an adjacent fuel cell. In order to solve the problem, as illustrated in FIG. 3, when the cell monitor connector 30 is connected to the end fuel cell, a conductive cover plate 36 (a dummy separator) having the same configuration as one of the separators of the end fuel cell which one terminal of the pair of terminals 31 of the cell monitor connector 30 is caused to contact is disposed at the end of the fuel cell stack 23, and the other terminal of the pair of terminals 31 of the cell monitor connector 30 is caused to contact the cover plate 36. The cover plate 36 is made from conductive material, for example, carbon.

Further adjacent to the cover plate 36 in the fuel cell stacking direction, the terminal 20 made from metal is disposed. The terminal 20 is connected to the outside electrical circuit. Further adjacent to the terminal 20, the electrical insulator 21 is disposed, and adjacent to the electrical insulator 21 the end plate 22 is disposed.

In the connecting structure of the cell monitor connector 30 to the fuel cell stack 23, a cell voltage is stable at an intermediate portion of the fuel cell stack in the fuel cell stacking direction compared with a cell voltage at an end portion of the fuel cell stack in the fuel cell stacking direction. In such a connecting structure, such a desire might happen as cell-voltage-monitoring for fuel cells located at the intermediate portion of the fuel cell stack 23 in the fuel stacking direction is to be thinned whereby a time period required for the cell-voltage-monitoring of the entire fuel cell stack is to be shortened. To satisfy such desire, when cell-voltage-monitoring for fuel cells located at the intermediate portion of the fuel cell stack 23 in the fuel cell stacking direction is thinned, a terminal 31 of the cell monitor connector 30 which is caused to contact a separator 18 of a fuel cell to be omitted in cell-voltage-monitoring is disconnected from a corresponding wire harness, without changing a structure of the cell monitor connector 30.

Figure 7:
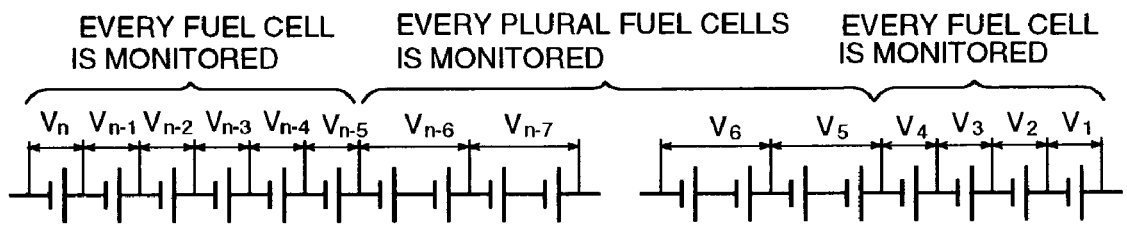
FIG. 7 is a diagram of a connecting structure of a cell monitor to a fuel cell stack where cell-voltage-monitoring for fuel cells located at an intermediate portion of the fuel cell stack is thinned.
Figure 8:
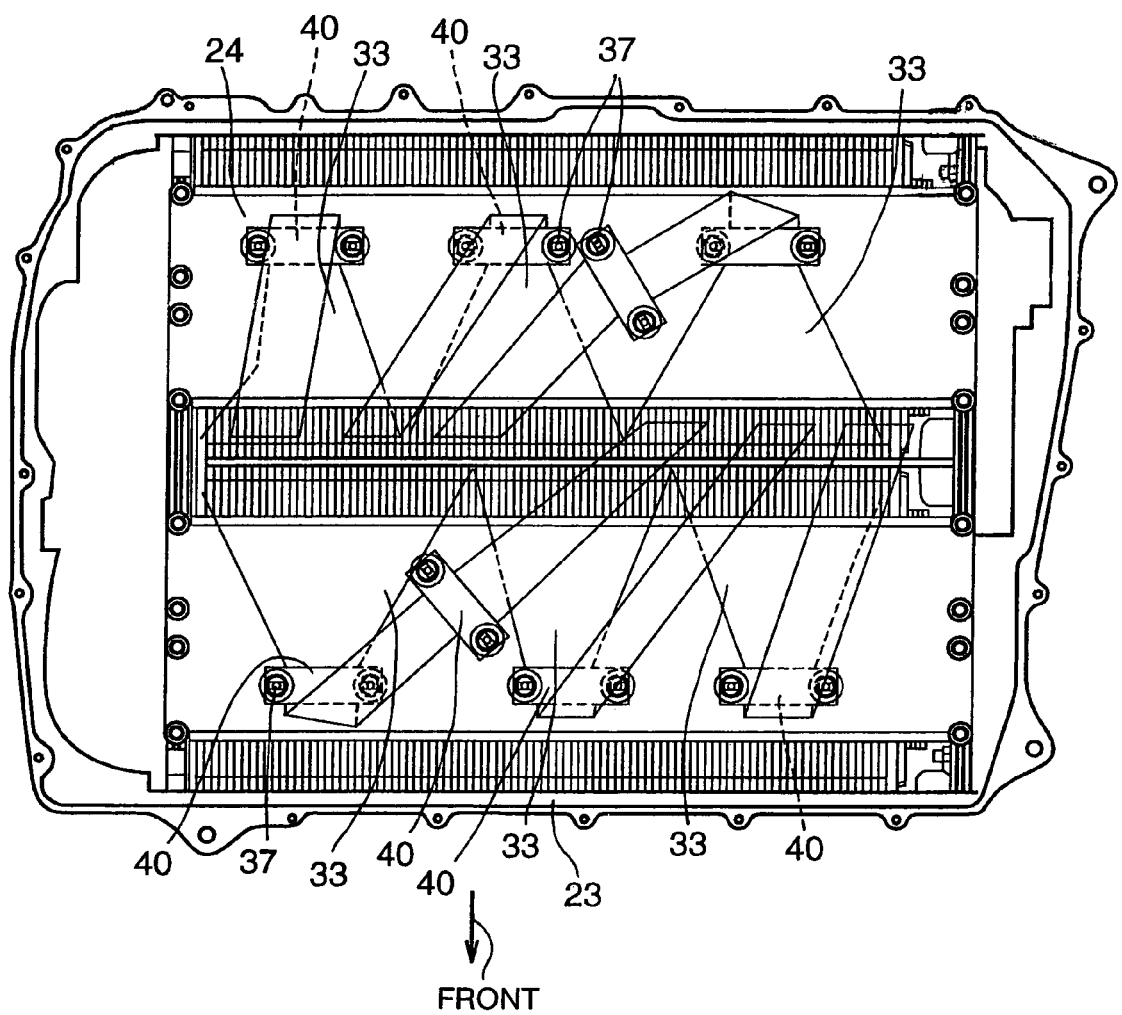
FIG. 8 is a plan view of a connecting structure of a cell monitor to a fuel cell stack where a number of cell monitor connectors are connected to a plurality of fuel cell stacks, before a base board fixing plate is coupled to the fuel cell stack.
Figure 9:
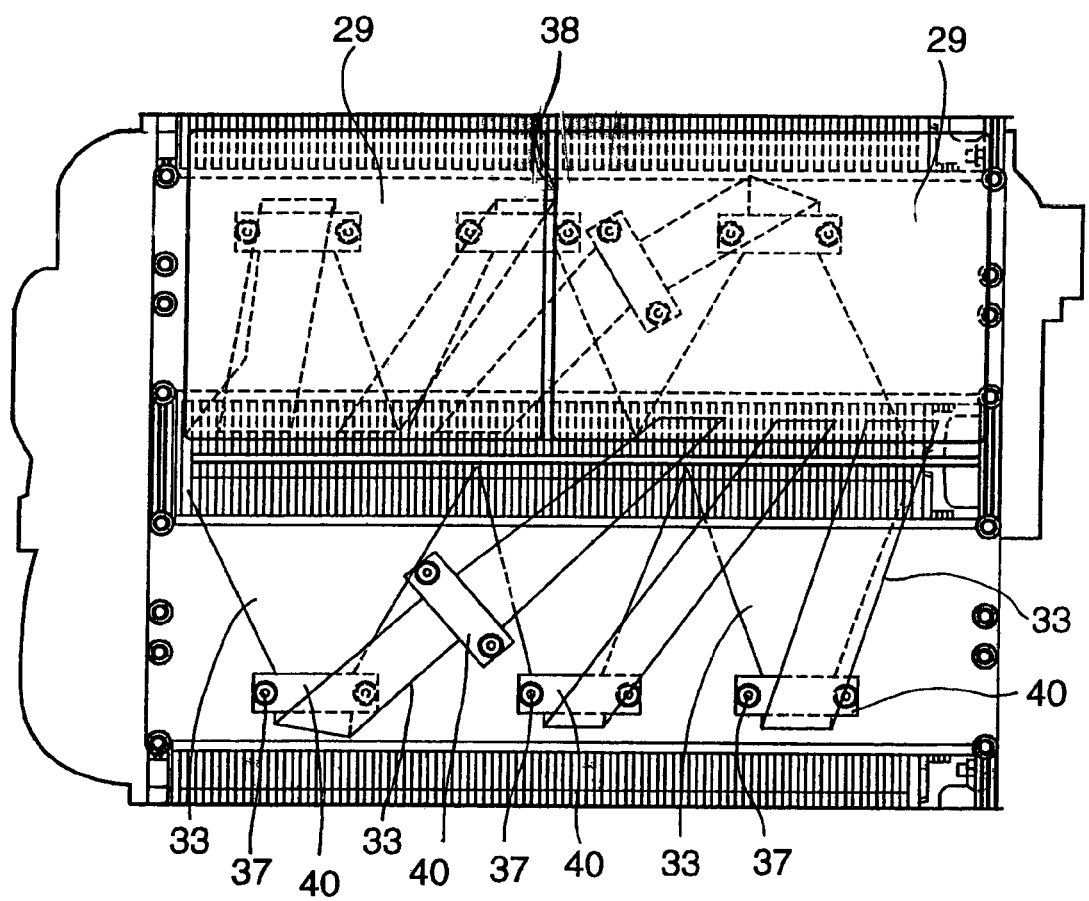
FIG. 9 is a plan view of a connecting structure of a cell monitor to a fuel cell stack where a number of cell monitor connectors are connected to a plurality of fuel cell stacks, after a base board fixing plate is coupled to the fuel cell stack.

As illustrated in FIGS. 7-9, a cell monitor 28 including a plurality of cell monitor connectors 30 is provided for monitoring a cell voltage of the fuel cell stack. Each of the cell monitor connectors 30 includes the housing 32 and the pair of terminals 31.

The plurality of the cell monitor connectors 30 are connected to the fuel cell stack 23. A distribution density of the terminals 31 may be varied according to a position in the fuel cell stacking direction, while the terminals 31 have a common structure.

In the embodiment of FIG. 7, the cell monitor connectors 30 are connected to every fuel cell of each fuel cell stack 23 at end portions (for example, at four to six fuel cells of the end portions) of each fuel cell stack 23 in a fuel cell stacking direction, while the cell monitor connectors 30 are connected to every plural fuel cells (for example, every two fuel cells) of each fuel cell stack 23 at an intermediate portion of each fuel cell in the fuel cell stacking direction. Since each fuel cell stack includes about two hundred fuel cells, the thinning of cell-voltage-monitoring at the intermediate portion of each fuel cell stack in the fuel cell stacking direction shortens the time period required for monitoring compared with that required for monitoring all of the fuel cells of the fuel cell stack.

The cell monitor 28 includes the cell monitor connector 30 connected to the fuel cell, a base board 29 for converting an analog voltage from the connector 30 to a digital control signal, and a wire harness 33 for transmitting the analog voltage signal to the base board 29.

As illustrated in FIGS. 7-9, a plurality of fuel cell stacks 23 are disposed in parallel with each other with a space therebetween and disposed horizontally with a fuel cell stacking direction of the fuel cell stacks 23 directed in a direction perpendicular to a longitudinal direction of a vehicle.

The cell monitor 28 is connected to the fuel cell 10 at the cell monitor connector 30. A plurality of cell monitor connectors 30 are connected to the plurality of fuel cell stacks 23. Connecting portions of the plurality of cell monitor connectors 30 with the plurality of fuel cell stacks 23 are positioned at end portions of the fuel cell stacks 23 on a side closest to the space between the fuel cell stacks 23 (the space between a front side fuel cell stack and a rear side fuel cell stack), where the end portions are collectively arranged in a direction transverse to a front-to-rear or rear-to-front direction of the fuel cell 10.

An order of a positive polarity and a negative polarity of the separators in the front side fuel cell stack in a direction from a right end to a left end of the front side fuel cell stack is the same as an order of a positive polarity and a negative polarity of the separators in the rear side fuel cell stack in a direction from a left end to a right end of the rear side fuel cell stack.

The wire harnesses 33 of the cell monitor 28 are insulated from each other by a resin cover. A plurality of wire harnesses are bundled into a flat cable. Each of the fuel cell stacks 23 is provided with a lower tension plate and an upper tension plate 24 having an upper surface. The wire harnesses 33 are fixed to the plurality of fuel cell stacks 23 at the upper surface of the upper tension plate 24 of each of the plurality of fuel cell stacks 23. The wire harness cable is clamped by a clamp 40, and the clamp 40 is fixed to the upper surface of the upper tension plate 24 by a stud-bolt 37, whereby the wire harnesses are fixed to the upper surface of the upper tension plate 24.

The wire harness cable extends from the cell monitor connectors located at one width end of the upper tension plate, gradually being decreased in cable width, to a position near the other width end of the upper tension plate, where the wire harness cable is fixed to the upper tension plate by the clamp 40 and the stud-bolt 37, and then is folded back to extend toward the one width end (the end close to the cell monitor connector 30) of the upper tension plate 24. At the one width end of the upper tension plate, the wire harnesses 33 are connected to the base board 29.

As illustrated in FIG. 9, a base board fixing plate 38 is provided above and fixed to the upper tension plate 24. The base board 29 is fixed to an upper surface of the base board fixing plate 38. The wire harnesses 33 are connected to the base board 29. Connecting portions of the wire harnesses 33 to the base board 29 are positioned at an end portion of one of the fuel cell stacks 23 on a side close to the space between the fuel cell stacks 23.

Next, technical advantages due to the above structures will be explained.

First, since the pair of terminals 31 (the two terminals) held by the housing 32 of one cell monitor connector 30 are caused to contact the separators 18 having the same polarity of the adjacent two fuel cells, an interval between the pair of terminals 31 of the one cell monitor connector 30 can be widened from an interval between the separator having a positive polarity and the separator having a negative polarity of one fuel cell to an interval between the separator having a positive polarity of one fuel cell and the separator having a positive polarity of an adjacent fuel cell, without causing an interference between the pair of terminals 31. In the structure, since an electric potential of the separator having a positive polarity of the adjacent fuel cell is the same as an electric potential of the separator having a negative polarity of the one fuel cell, an electrical voltage between the separators having the same polarity of the adjacent two fuel cells is the same as that between the separators having opposite polarities of the one fuel cell. As a result, a cell voltage of each fuel cell can be monitored without causing an interference between the pair of terminals 31.

In the above structure, since the cell voltage of one fuel cell is monitored over adjacent two fuel cells, the cell voltage of the end fuel cell cannot be monitored. However, in the present invention, since the cover plate 36 (a dummy separator) having the same configuration as that of the separator 18 of the end fuel cell which one of the terminals 31 of the cell monitor connector 30 is caused to contact is disposed at the end of the fuel cell stack 23, and the other of the terminals 31 of the cell monitor connector 30 is caused to contact the cover plate 36, a cell voltage of the end fuel cell can be monitored by measuring an electrical voltage between the separator 18 of the end fuel cell and the cover plate 36.

A cell voltage of a fuel cell located at an intermediate portion of the fuel cell stack 23 in the fuel cell stacking direction is relatively stable compared with that of a fuel cell located at an end portion of the fuel cell stack 23. Therefore, cell-voltage-monitoring can be thinned out at the intermediate portion of the fuel cell stack 23, whereby a time period required for monitoring the entire fuel cell stack 23 can be shortened. Further, the connecting structure becomes simple and compact due to the thinning. Since the thinning is performed by only disconnecting the terminal 31 from the corresponding wire harness 33, the thinning can be performed without changing the arrangement and structure of the cell monitor connector 30. As a result, the connecting structure of the cell monitor connector 30 to the fuel cell stack can be common over a fuel cell to be conducted in monitoring and a fuel cell to be omitted in monitoring, and the structure can be standardized.

In the thinning, cell-voltage-monitoring may be performed every two fuel cells or every plural (more than two) fuel cells.

In the connecting structure of the cell monitor 28 to the fuel cell stack 23, since connecting portions of the plurality of cell monitor connectors 30 of the cell monitor 28 and the plurality of fuel cell stacks 23 arranged parallel to each other in a space between the fuel cell stacks 23 are positioned at end portions of the fuel cell stacks 23 on a side close to the space between the fuel cell stacks 23, the connecting portions at the front side fuel cell stack and the connecting portions at the rear side fuel cell stack are close to each other and are arranged symmetrical to each other. As a result, the connecting structure of the cell monitor 28 to the fuel cell stacks 23 are simple and compact. Further, since the connecting portions of the cell monitor connectors 30 to the fuel cell stacks are positioned at the end portions of the stacks on the side closest to the space between the front fuel cell stack and the rear fuel cell stack, the connecting portions are protected even at the time of a front collision of the vehicle so long as the stack is not collapsed.

Further, since the wire harnesses 33 of the cell monitor 28 is fixed to the upper surface of the upper tension plate 24 located above the pile of fuel cells, the wire harnesses 33 can be fixed to the fuel cell stack simply and compactly availing the upper surface of and a space above the upper tension plate 24. Further, since the wire harnesses 33 can be fixed to the upper surface of the upper tension plate after the fuel cell stack has been mounted to the vehicle, the mounting of the fuel cell stacks 23 to the vehicle and the fixing of the wire harnesses 33 to the fuel cell stacks 23 can be conducted at different steps, which makes mounting of the fuel cell stacks to the vehicle easy.

Further, since the base board fixing plate 38 having the base board 29 arranged at the upper surface of the plate 38 is disposed above and fixed to the upper tension plate 24, the base board 29 can be disposed compactly and simply, availing a space above the base board fixing plate 38 and the upper tension plate 24. Further, the connecting portions of wire harnesses 33 to the base board 29 are positioned at the width end of the base board fixing plate 38 on the side closest to the space between the front side fuel cell stack and the rear side fuel cell stack, thus, the connecting portions are protected even at the time of a front collision of the vehicle.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A fuel cell stack comprising:
a cell monitor connector connected to the fuel cell stack, the cell monitor connector including a plurality of terminals configured in pairs of terminals and each pair of terminals is located in a terminal pair housing;
a plurality of fuel cells forming layers, each of the fuel cells including a plurality of separators;
wherein when the cell monitor connector is connected to the fuel cell stack, a first terminal of a first pair of the plurality of terminals located in a terminal pair housing is caused to contact a first separator of the plurality of separators of a first fuel cell of the plurality of fuel cells of the fuel cell stack, and a second terminal of the plurality of terminals of the cell monitor connector is caused to contact a second separator, which has the same polarity as the first separator of the first fuel cell, of the plurality of separators of a second fuel cell of the plurality of fuel cells adjacent to the first fuel cell, and
a conductive cover plate having the same configuration as the first separator and having a polarity opposite the polarity of the first separator, in which a third terminal of a second pair of the plurality of terminals of the cell monitor connector disposed at the end of the fuel cell stack is caused to contact the cover plate,
wherein the first separator which the first terminal of the first pair of terminals is caused to contact has in a peripheral portion thereof a bulging portion bulging out relative to a peripheral portion of the second separator, the first terminal being caused to contact the first separator at the bulging portion and the cell monitor connector holds the bulging portion of the first separator in a thickness direction of the first separator.

2. The fuel cell stack according to claim 1, wherein the bulging portion of the first separator is formed by causing a portion of the first separator which the first terminal contacts to protrude outward from a peripheral portion of the second separator which the terminal does not contact.

3. The fuel cell stack according to claim 1, wherein the bulging portion of the first separator is formed by forming a recess in the peripheral portion of the second separator which the terminal does not contact so that the portion of the peripheral portion of the first separator which the first terminal contacts bulges out from the recess.

4. The fuel cell stack according to claim 1, wherein the bulging portion of the first separator is formed both by causing a portion of the first separator which the first terminal contacts to protrude outward from the peripheral portion of the second separator which the first terminal does not contact and by forming a recess in the peripheral portion of the second separator which the first terminal does not contact so that the portion of the peripheral portion of the first separator which the first terminal contacts bulges out from the recess.

5. The fuel cell stack according to claim 1, wherein when a cell monitor is monitoring cell voltage of fuel cells located at an intermediate portion of the fuel cell stack in a fuel cell stacking direction, a terminal of a third pair of terminals of the cell monitor connector is disconnected from a corresponding wire harness to omit monitoring the cell voltage of a fuel cell in the intermediate portion, without changing a structure of the cell monitor connector.

* * * * *

UNITED STATES PATENT AND TRADEMARK OFFICE
CERTIFICATE OF CORRECTION

PATENT NO. : 7,682,714 B2 Page 1 of 1
APPLICATION NO. : 10/140828
DATED : March 23, 2010
INVENTOR(S) : Akira Aoto et al.

It is certified that error appears in the above-identified patent and that said Letters Patent is hereby corrected as shown below:

On the Cover Page, item (57), in the Abstract, Line 2: After "terminals" delete "is".

Signed and Sealed this

First Day of June, 2010

David J. Kappos
*Director of the United States Patent and Trademark Office*